US00RE44930E

(19) United States
(12) Reissued Patent
Burchard et al.

(10) Patent Number: US RE44,930 E
(45) Date of Reissued Patent: Jun. 3, 2014

(54) DATA EXCHANGE SYSTEM WITH A MOBILE COMPONENT TO CONTROL CONSUMER

(75) Inventors: Bernd Burchard, Essen (DE); Stefan Prange, Munich (DE)

(73) Assignee: France Brevets, Paris (FR)

(21) Appl. No.: 12/926,739

(22) Filed: Dec. 7, 2010

Related U.S. Patent Documents

Reissue of:
(64) Patent No.: 7,085,566
Issued: Aug. 1, 2006
Appl. No.: 09/980,595
PCT Filed: Apr. 3, 2000
PCT No.: PCT/DE00/01011
§ 371 (c)(1),
(2), (4) Date: Oct. 30, 2001
PCT Pub. No.: WO00/67429
PCT Pub. Date: Nov. 9, 2000

(30) Foreign Application Priority Data

Apr. 30, 1999 (DE) ..... 199 19 921

(51) Int. Cl.
*H04Q 7/20* (2006.01)

(52) U.S. Cl.
USPC ..... 455/434; 455/435.1; 455/436; 455/445; 370/252; 370/341; 370/347; 370/338

(58) Field of Classification Search
USPC ..... 455/434, 435, 436, 445, 556, 557
See application file for complete search history.

(56) References Cited

U.S. PATENT DOCUMENTS

| | | | | |
|---|---|---|---|---|
| 5,546,471 | A * | 8/1996 | Merjanian | 382/124 |
| 5,875,395 | A | 2/1999 | Holmes | |
| 5,963,624 | A * | 10/1999 | Pope | 379/110.01 |
| 5,990,803 | A | 11/1999 | Park | |
| 6,225,890 | B1 | 5/2001 | Murphy | |
| 6,285,868 | B1 * | 9/2001 | LaDue | 455/410 |
| 6,308,062 | B1 * | 10/2001 | Chien et al. | 455/420 |
| 6,490,291 | B1 * | 12/2002 | Lee et al. | 370/401 |
| 6,519,241 | B1 * | 2/2003 | Theimer | 370/338 |
| 6,526,579 | B2 * | 2/2003 | Sato | 725/58 |
| 6,577,861 | B2 * | 6/2003 | Ogasawara | 455/419 |
| 6,628,965 | B1 * | 9/2003 | LaRosa et al. | 455/557 |
| 6,728,881 | B1 | 4/2004 | Karamchetty | |
| 6,799,037 | B1 * | 9/2004 | Mielke et al. | 455/435.1 |
| 2002/0098834 | A1 * | 7/2002 | Yuen | 455/420 |
| 2004/0259537 | A1 * | 12/2004 | Ackley | 455/420 |

FOREIGN PATENT DOCUMENTS

| | | | |
|---|---|---|---|
| DE | 43 21 304 | A1 | 3/1995 |
| DE | 196 00 209 | A1 | 7/1997 |
| DE | 298 17 564 | U1 | 12/1998 |
| EP | 0 805 594 | A2 | 11/1997 |
| EP | 0 838 768 | A | 4/1998 |
| EP | 0 838 768 | A2 | 4/1998 |
| KR | 1998-023623 | | 7/1998 |
| WO | 99/09780 | | 2/1999 |

OTHER PUBLICATIONS

Nokia 9000il Owner's Manual, 1998.

(Continued)

*Primary Examiner* — Patrick Edouard
*Assistant Examiner* — Julio Perez
(74) *Attorney, Agent, or Firm* — Baker Hostetler LLP

(57) ABSTRACT

A mobile component of a data exchange system, in particular a mobile telephone of a home mobile radio system, is equipped with an Internet interface in order to transmit control commands via the Internet interface to a control device in order to control one or more consumers, whereby the control device converts these control commands into a corresponding control of the required consumer.

8 Claims, 2 Drawing Sheets

(56) References Cited

OTHER PUBLICATIONS

Crestron Command Center Brochure Jan. 1998.
Crestron Control Products Catalog, 1998-1999.
"Per GSM-Handy Ins Internet" Computerwoche, Feb. 27, 1998.
HTML 4.0 Guidelines for Mobile Access, Mar. 15, 1999.
J. Desbonnet, P Corcoran, "System Architecture and Implementation of a CEBus/Internet Gateway" Jun. 18, 1997.
"Crestron announces the first and only Internet-based control system Crestron e-controle®" Crestron Press Release, Mar. 17, 1999.
Now York Times, "What's Next; Signing On With Your Fingerprints" Mar. 18, 1999.
"Alizeit arbeitsbereit mit Handy und Notebook" Computerwoche, Jan. 3, 1997. (w/Translation).
Crestron Series STX Touchpanels, Operations Guide, Mar. 1999.
WAP 1.0 Standard, "Wireless Application Protocol/Wireless Application Environment Overview", Apr. 30, 1998.
Cresnet® US Trademark Serial No. 73477307, Apr. 26, 1984.
Crestron Visiontools® US Trademark Serial No. 74693081, Jun. 26, 1995.
IEEE Std 802.11-1997, Jun. 26, 1997.
R. Broida, "Got two PCs? We put the latest file-, printer-, and Internet- sharing solutions for your home office to the test" The Home Network Connection, Apr. 1999.
ETS 300 511, Chapter 4.6.1 Jul. 1995.
Nokia 9000i Communicator Specs, Oct. 1997.
Crestron e-control product information, 1999.
Trimble Navigation Spec. Sheet(s) for Placer GPS 450/455 Unit.
Trimble Navigation Spec. Sheet(s) for Cross Check AMPS Cellular Unit.
"Seeing with Sonar", Wired Magazine, Feb. 1998, 1 pp.
"The Body as Password", Wired magazine, Jul. 1997, 5 pp.
M. Norris, "Understanding Networking Technology: Concepts, Terms and Trends", 2nd edition, Artech House 1999.
R. A. McKenzie, "Wireless Laptop Computing: A New Direction in Student Computing" CUMREC 1999.
Corcoran, P., et al.; IEEE Transactions on Consumer Electronics, vol. 44, No. 3, Aug. 1998; User Interface Technologies for Home Appliances and Networks; pp. 679-685.
Corcoran, P.; IEEE Transactions on Consumer Electronics, vol. 44, No. 3, Aug. 1998; Mapping Home-Network Appliances to TCP/IP Sockets Using a Three-Tiered Home Getaway Architecture; pp. 729-736.
Corcoran, P., et al.; IEEE 1996; CEBus Network Access via the World-Wide-Web; pp. 236-237.
Corcoran, P., et al.; IEEE Transactions on Consumer Electronics, vol. 43, No. 4, Nov. 1997; Browser-Style Interfaces to a Home Automation Network; pp. 1063-1069.
Cucos, A., et al.; IEEE Transactions on Consumer Electronics, vol. 44, No. 3, Aug. 1998; Real Time ATM for Remote Access to Home Automation and Digital Home A/V Networks; pp. 482-489.
Essick, K.; IDG News, PC World—Compaq to Launch Fingerprint ID Module for PCs; pp. 1-4; Jun. 30, 1998.
Crestron Control Products Catalog 1998-1999 ("Crestron Catalog"), published May 1998 by Crestron Electronics, Inc. 15 Volvo Drive, Rockleigh, NJ 07647.
WAP 1.0 Standard ("WAP WAE"), "Wireless Application Protocol/Wireless Application Environment Overview", published Apr. 30, 1998 by Wireless application Protocol Forum, Ltd. (now Open Mobile Alliance Ltd.) 2570 W. El Camino Real, Suite 304, Mountain View, CA 94040-1313 USA (available at http://www.wapforum.org/what/technical_1_0.htm).
Craig Hinton, What does the future hold for WAO?, May 25, 2000, computerweekly.com, pp. 3□□MobilInfto, What is WAP, pp. 3.*
System Architecture and Implementation of a CEBus/Internet Gateway, Joe Desbonnet et al., Dept. of Electronic Engineering, University College, Galway, Ireland, Jun. 18, 1997, pp. 1057-1062.
Information Appliances: From Web Phones to Smart Refrigerators, Lee Goldberg, pp. 69-70, 74,76,78,80,82,84.

* cited by examiner

DATA EXCHANGE SYSTEM WITH A MOBILE COMPONENT TO CONTROL CONSUMER

Matter enclosed in heavy brackets [ ] appears in the original patent but forms no part of this reissue specification; matter printed in italics indicates the additions made by reissue.

BACKGROUND OF THE INVENTION

The present invention relates to a data exchange system, in particular a mobile telephone system or home mobile telephone system for controlling devices or consumers.

A system to control a multiplicity of electrical consumers is described in the publication WO 99/09780. These consumers are accessible via intermediate actuators via an IP address. Furthermore, the use of an interface to the Internet, whereby consumers can be controlled, is known from the publication EP 0 838 768 A2.

The mobile telephone is being developed into a mass-market product. It is foreseeable that the mobile telephone will, in the future, become a standard device in daily life.

The CTS, (Cellular Telephony System) is currently in the standardization phase. The CTS enables the use of a mobile telephone as a cordless telephone in the home on a home base station. The home base station serves as an interface between the mobile telephone and the fixed network and allows calls to be made from the mobile telephone via the fixed network.

Furthermore, the use of mobile telephones for remote control purposes in the home is also currently under discussion. Integration of an infrared interface into mobile telephones is currently envisaged, so that different devices in the home can be controlled with the aid of a mobile telephone via infrared control signals. Thus, mobile telephones can be used in as remote controls with a learning capability. However, the equipment of mobile telephones with an infrared interface is associated with the disadvantages that additional hardware outlay, an additional radiation line for the infrared LED and a direct line-of-sight contact between the corresponding mobile telephone and the devices which are to be remotely controlled are required. In addition, applications are already known in which mobile telephones are used in the home to control consumers. Thus, for example, a data exchange system implemented on the basis of a home mobile radio system is known in which a mobile telephone operated according to the DECT standard (Digital European Cordless Telephone) is used to control a television set, which also contains the base station of the mobile radio system.

SUMMARY OF THE INVENTION

An object of the present invention, therefore, is to provide a simple facility for controlling consumers via a mobile data exchange device, in particular via a mobile telephone.

The present invention is based on a data exchange system in which a mobile component is used to control a consumer. According to the present invention, the control commands are transmitted from the mobile component via an Internet interface to a control device. The data exchange system may be designed in the form of a home mobile radio system, so that a mobile telephone with an Internet interface is used as the mobile component.

Since plans already exist to equip high-end telephones with an Internet interface in the near future, no additional hardware is essentially required in a mobile telephone of this type for remote control of consumers. The present invention offers the particular advantage that devices from different manufacturers can communicate with one another on the basis of standard Internet data transmission.

Preferably, if a mobile telephone is used as the mobile component, this can be operated on a home base station as a cordless telephone. According to the present invention, different consumers which are to be remotely controlled are connected to this home base station so that, via the home base station, remote control of these consumers is possible via any type of data connection.

Since the standard home base station is normally designed merely as a communications interface between the mobile telephone and a communications network, an additional control is required which, on the one hand, is controlled from the mobile telephone via the Internet interface of the mobile telephone and which, on the other hand, forwards the control commands accordingly via the data connection to the individual consumers or devices. The control, therefore, performs the function of a home server.

The home base station may, for example, be based on the GSM standard (Global System for Mobile Communication) or the UMTS standard (Universal Mobile Telecommunication System) and the CTS standard.

Furthermore, control of consumers via a mobile telephone offers the advantage that a system for identification and authentication of the user is already available for mobile telephones, so that this system can also be used for access restriction for various consumers or their functions.

Additional features and advantages of the present invention are described in, and will be apparent from, the following Detailed Description of the Invention and the Figures.

DETAILED DESCRIPTION OF THE INVENTION

Figure 1:
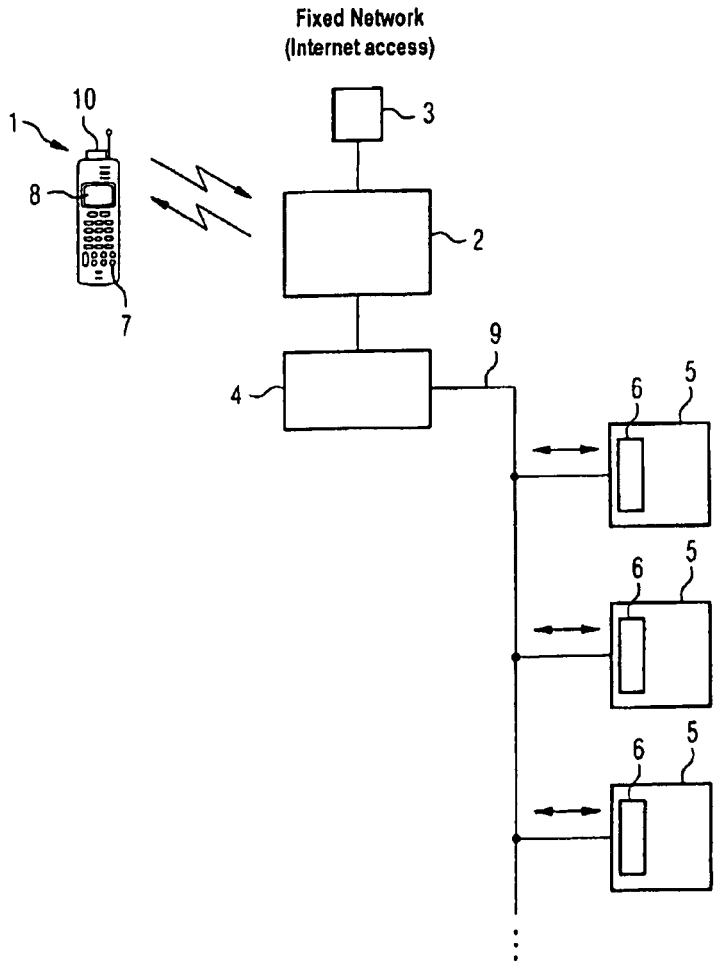
FIG. 1 shows a schematic block diagram in accordance with an embodiment of the present invention.

FIG. 1 schematically shows a home mobile telephone system according to an embodiment of the present invention. In general, the home mobile telephone system includes a mobile telephone 1, a home base station 2 which is connected via a connection or an interface 3 to a communications network, and a home server 4 which is connected to the home base station 2. The communications network may be a fixed telephone network, a satellite communications network, a radio network or, with the use of "power line technology", also a power network, or the like.

Preferably, the home mobile telephone system is designed according to the CTS standard in such a way that, with the aid of the home base station 2, a communications link can be set up between the mobile telephone 1 and the communications network. The home base station 2 therefore serves as a communications interface between the mobile telephone 1 and the communications network, and enables the use of the mobile telephone 1 as a cordless telephone in the home.

The home server 4 serves as a control device to convert control commands transmitted by the mobile telephone 1 into a corresponding control of various consumers 5. For this purpose, the consumers 5 are connected via a data transmission line or path 9 to the home server 4. This may involve not only wired data transmission but also wireless data transmission (e.g., infrared signal transmission).

It is known that control commands can, in principle, be transmitted via the Internet (World Wide Web, WWW). Current Internet and Java developments are designed to network devices via the Internet and remotely control these devices with the aid of control commands transmitted via the Internet. It can be assumed that, in the near future, all high-end telephone devices will possess an Internet interface in order to access the Internet.

In the embodiment shown in FIG. 1, the mobile telephone 1 is also equipped with an Internet interface, so that the control commands to control various consumers are transmitted by the mobile telephone in an Internet-compatible format. The WAP standard (Wireless Application Protocol) can be used for this purpose. The home server 4 connected to the home base station 2 is correspondingly equipped with a function to evaluate Internet control commands of this type in order to convert these Internet control commands into normal analog or digital control commands to control the various consumers. Via the home base station 2, normal Internet access is available via the fixed telephone network connection 3.

The consumers 5 connected to the data transmission path 9 may, in principle, involve any given home or office devices. Thus, for example, remote control of television sets, personal computers, hi-fi systems, video recorders, air-conditioning systems, heating devices, the like and combinations thereof is conceivable with the aid of the mobile telephone 1.

The individual consumers are preferably controlled via the data transmission path 9 in digital form, since digital signal transmission offers greater transmission reliability than analog signal transmission. The individual consumers 5 can, therefore, be controlled by the home server 4 in the form of digital control words, whereby the control words, depending on the control commands entered via the keypad 7 of the mobile telephone 1, contain device-specific or consumer-specific addresses in order to address the required consumers 5. Thus, each consumer 5 is equipped with a corresponding digital data interface which monitors the control words present on the data transmission path 9 for the occurrence of its own address and converts the control commands accordingly if it is itself addressed.

The data transmission path 9 is preferably designed as two-way, so that the different consumers 5 can be not only controlled, but also monitored (i.e., status information relating to the individual consumers 5 also can be retrieved from the mobile telephone 1). For example, it can thus be determined whether a specific television set is switched on or not. The return messages from the home base station 2 to the mobile telephone 1 are likewise preferably transmitted via the Internet interface.

Normal communication between the home base station 2 and the mobile telephone 1 can be carried out according to any given mobile radio standard, such as GSM, DECT (Digital European Cordless Telephone) or Bluetooth, or also via infrared transmission. The use of dual-mode devices (e.g., DECT/GSM) is similarly conceivable. In addition, the control commands also can be transmitted from the mobile telephone to the home base station 2 or to the home server 4 connected thereto in a different frequency band and with a shorter range than in normal call data transfer.

Figure 2:
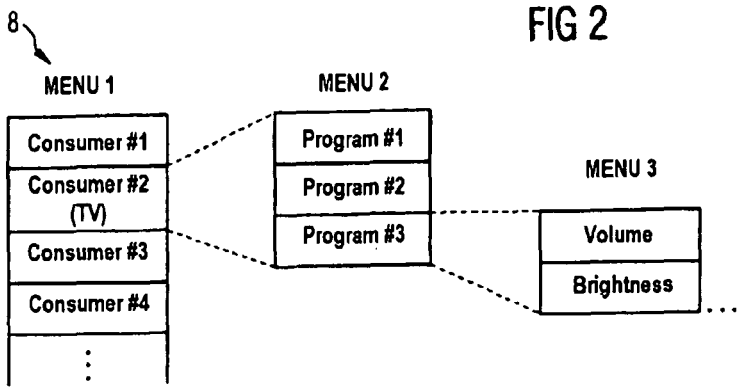
FIG. 2 shows a representation illustrating a hierarchical menu structure which can be used in the system shown in FIG. 1 to control various consumers.

The different consumers 5 can be controlled from the mobile telephone 1 via a hierarchical menu structure, as shown in FIG. 2. This menu structure may be implemented on the mobile telephone 1 or may be offered to the mobile telephone 1 by the home server 4. Once the user has selected the control menu, the first menu shown in FIG. 2, for example, is presented on a display unit 8 of the mobile telephone 1. With the aid of this menu, the user can, preferably via the keypad 7 or a different input medium, make a preselection concerning the device or consumer 5 which is to be controlled. If a television set (TV) has been selected as the device to be controlled, the second menu shown in FIG. 2, for example, is presented on the display unit 8, via which menu the required television program can be selected. Following the selection of a television program, a further menu can be presented, with which, for example, as shown in FIG. 2, the volume or brightness or the like can be set.

An advantage in the remote control of consumers 5 with the aid of a mobile telephone 1 is that a system for identifying and authenticating the user is already provided for mobile telephones. Thus, GSM mobile telephones 1 can only be operated with "SIM cards" 10 (Subscriber Identification Module), which are inserted into the mobile telephone 1 and which contain identification information relating to the relevant user which subsequently can be checked in order to release the mobile telephone 1 for the authorized user only. User authentication in the mobile telephones 1 is becoming increasingly reliable. Fingerprint recognition, for example, is also currently under discussion. In addition, identification through voice recognition is also possible.

The above-mentioned identification and authentication options for mobile telephones 1 can be used in the context of the present invention in order to selectively release only specific consumers or devices 5 or corresponding functions of the consumers for the relevant user. If the present invention is used in the office domain, it is possible, for example, following user identification, to determine whether this user, in controlling a personal computer, is even authorized to switch it on. If not, access is denied. Access authorization can be checked in both the mobile telephone 1 and the home base station 2 or in the home server 4. Similarly, with the aid of the identification options of the mobile telephone 1, only specific functions of the relevant controlled device 5 can be protected against unauthorized access. Thus, for example, specific television programs can be released in this way for specific users or can be blocked (e.g., for children).

Figure 3:
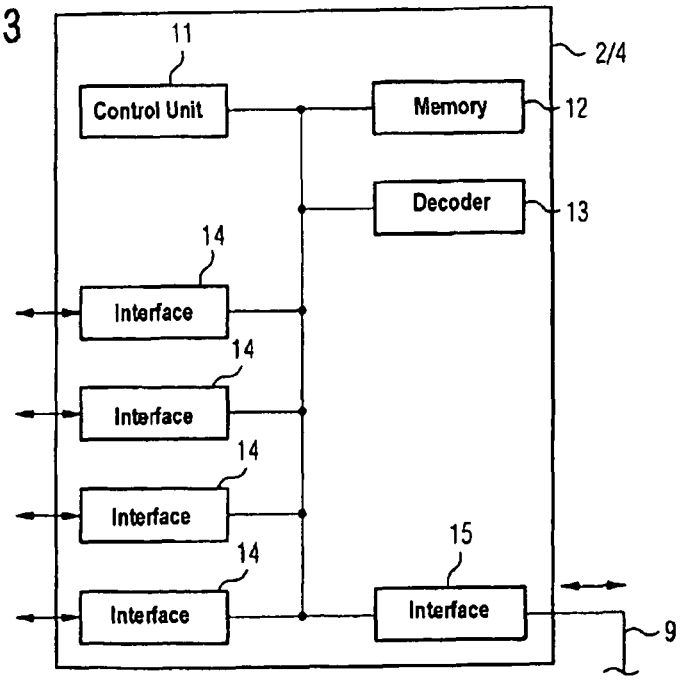
FIG. 3 shows a variation of the system structure shown in FIG. 1.

Due to the increasing computing power of available computer components and increasing integration, different system components can be functionally combined in one device. Thus, it is possible for the home server 4 and the home base station 2 to form one unit, as indicated in FIG. 3.

A unit of this type may internally include one or more control units (CPUs) 11, one or more memories 12 to store software and/or data, ancillary units (e.g., MPEG decoders 13) and different interfaces 14, 15 for connection with other devices. These interfaces may, for example, be wire-based or wireless, or may support "power line technology". The use of dielectric conductors, such as optical fibers, is also conceivable. The interface 15 provides a connection to the data transmission path 9.

The functionality of a combination unit of this type may, for example, include the functionality of a television set, whereby the combination unit receives a television program via one of the interfaces 14 (e.g., via a television cable connection) and converts these data with the aid of the MPEG decoder 13 into an image data stream. One of the controlled consumers 5 may be designed as a digital monitor which receives the image data from the combination unit via the data transmission path 9 which is designed as an IEEE1394 bus.

In parallel with this television operation, processes run on the control unit(s) 11 which ensure wireless communication between the combination unit and the mobile component 1 shown in FIG. 1. The mobile unit 1 may serve as a further input/output unit for the processes of the combination unit. The data entered via the mobile component 1 may be transmitted via one of the connected interfaces 14, 15 of the combination unit to other data-processing devices or consumers 5.

Although the present invention has been described with reference to specific embodiments, those of skill in the art will recognize that changes may be made thereto without departing from the spirit and scope of the invention as set forth in the hereafter appended claims.

The invention claimed is:

[1. A data exchange system, comprising:

a mobile component; and a control device for receiving control commands from the mobile component to control at least one consumer, converting the control commands into corresponding control signals and transmitting the control signals via a data transmission path to the consumer to be controlled;

wherein the mobile component further comprises an Internet interface to transmit control commands to the control device, the control device evaluating the control commands and converting the control commands into a corresponding control of the consumers connected to the data transmission path, and wherein the mobile component further comprises an identification unit for supplying information to identify the user of the mobile component, at least one of the mobile component and the control device evaluating the identification information supplied by the identification unit in order to release at least one of access to the consumers connected to the data transmission path and individual functions of the consumers.]

2. A data exchange system as claimed in claim 1, wherein the mobile component is a mobile telephone *comprising an Internet interface*.

[3. A data exchange system as claimed in claim 1, wherein the control device further comprises an interface device for creating a communications interface between the mobile component and a communications network.]

4. A data exchange system as claimed in claim 3, wherein the control device is controlled by the mobile component in a different frequency range than a frequency range used for the transmission of communications information between the mobile component and the interface device.

5. A data exchange system as claimed in claim 1, wherein the control device, the data transmission path and the consumers to be controlled are accommodated in one housing unit.

[6. A data exchange system as claimed in claim 1, wherein the data transmission path is a bus line via which a plurality of consumers can be controlled with the aid of the mobile component and the control device.]

[7. A data exchange system as claimed in claim 1, wherein the control device makes a status query relating to the consumers connected to the data transmission path with the aid of the mobile component.]

[8. A data exchange system as claimed in claim 1, wherein the consumers connected to the data transmission path can be controlled via a hierarchical menu structure which can be presented on a display unit of the mobile component when the control device is controlled by the mobile component.]

[9. A data exchange system as claimed in claim 1, wherein the mobile component and the control device transmit the control commands via the Internet interface of the mobile component in accordance with the WAP protocol.]

*10. A data exchange system, comprising:*

*a mobile component; and*

*a control device for receiving control commands in an Internet compatible format from the mobile component via a mobile device communication protocol to control at least one consumer, converting the control commands into corresponding control signals and transmitting the control signals via a data transmission path to the consumer to be controlled,*

*wherein the mobile component further comprises an Internet interface to transmit control commands to the control device in the Internet compatible format, the control device evaluating the control commands and converting the control commands into a corresponding control of the consumer connected to the data transmission path, and*

*wherein the mobile component further comprises an identification unit for supplying information to identify the user of the mobile component, at least one of the mobile component and the control device evaluating the identification information supplied by the identification unit in order to release at least one of access to the consumer connected to the data transmission path and individual functions of the consumer.*

*11. A data exchange system, comprising:*

*a mobile component; and*

*a control device for receiving control commands from the mobile component to control at least one consumer, converting the control commands into corresponding control signals and transmitting the control signals via a data transmission path to the consumer to be controlled,*

*wherein the mobile component further comprises an Internet interface to transmit control commands to the control device in an Internet compatible format, the control device evaluating the control commands and converting the control commands into a corresponding control of the consumer connected to the data transmission path,*

*wherein the mobile component further comprises an identification unit for supplying information to identify the user of the mobile component, at least one of the mobile component and the control device evaluating the identification information supplied by the identification unit in order to release at least one of access to the consumer connected to the data transmission path and individual functions of the consumer, and*

*wherein the consumer is equipped with a digital data interface.*

*12. A data exchange system, comprising:*

*a mobile component; and*

*a control device for receiving control commands from the mobile component to control at least one consumer, converting the control commands into corresponding control signals and transmitting the control signals via a two-way data transmission path to the consumer to be controlled,*

*wherein the mobile component further comprises an Internet interface to transmit control commands to the control device in an Internet compatible format, the control device evaluating the control commands and converting the control commands into a corresponding control of the consumer connected to the data transmission path, and*

*wherein the mobile component further comprises an identification unit for supplying information to identify the user of the mobile component, at least one of the mobile component and the control device evaluating the identification information supplied by the identification unit*

*in order to release at least one of access to the consumer connected to the data transmission path and individual functions of the consumer.*

*13. A data exchange system, comprising:*

*a mobile component; and*

*a control device for receiving control commands from the mobile component to control at least one consumer, converting the control commands into corresponding control signals and transmitting the control signals via a data transmission path to the consumer to be controlled,*

*wherein the mobile component further comprises an Internet interface to transmit control commands to the control device in an Internet compatible format, the control device evaluating the control commands and converting the control commands into a corresponding control of the consumer connected to the data transmission path, and*

*wherein the mobile component further comprises an identification unit for supplying information to identify the user of the mobile component, wherein both the mobile component and the control device evaluating the identification information supplied by the identification unit in order to release at least one of access to the consumer connected to the data transmission path and individual functions of the consumer.*

*14. A data exchange system, comprising:*

*a mobile component; and*

*a control device for receiving control commands from the mobile component to control at least one consumer, converting the control commands into corresponding control signals and transmitting the control signals via a data transmission path to the consumer to be controlled,*

*wherein the mobile component further comprises an Internet interface to transmit control commands to the control device in an Internet compatible format, the control device evaluating the control commands and converting the control commands into a corresponding control of the consumer connected to the data transmission path,*

*wherein the mobile component further comprises an identification unit for supplying information to identify the user of the mobile component, at least one of the mobile component and the control device evaluating the identification information supplied by the identification unit in order to release at least one of access to the consumer connected to the data transmission path and individual functions of the consumer, and*

*wherein the consumer connected to the data transmission path is controlled via a hierarchical menu structure which is implemented on the mobile component, the hierarchical menu being presented on a display unit of the mobile component when the control device is controlled by the mobile component.*

* * * * *